United States Patent [19]

Thies et al.

[11] Patent Number: 5,512,231
[45] Date of Patent: Apr. 30, 1996

[54] PROCESSING CELLULOSE ACETATE FORMED ARTICLES USING SUPERCRITICAL FLUID

[75] Inventors: Mark C. Thies, Clemson; Nnamdi E. Aniedobe, North Augusta, both of S.C.; George A. Serad, Charlotte, N.C.

[73] Assignee: Hoechst Celanese Corporation, Somerville, N.J.

[21] Appl. No.: 378,705

[22] Filed: Jan. 26, 1995

[51] Int. Cl.$^6$ .............................. D01D 1/10; D01F 2/28; D01F 2/30
[52] U.S. Cl. ........................... 264/169; 264/203; 264/207
[58] Field of Search ................................... 264/169, 200, 264/203, 207

[56] References Cited

U.S. PATENT DOCUMENTS

| | | | |
|---|---|---|---|
| 4,308,200 | 12/1981 | Fremont | 530/202 |
| 4,493,797 | 1/1985 | Avedesian | 530/507 |
| 4,675,198 | 6/1987 | Sevenants | 426/425 |
| 5,009,746 | 4/1991 | Hossain et al. | 162/5 |
| 5,328,934 | 7/1994 | Schiraldi | 521/40 |

*Primary Examiner*—Leo B. Tentoni
*Attorney, Agent, or Firm*—Philip P. McCann

[57] ABSTRACT

A process for preparing cellulose acetate articles such as fibers. The process includes the following steps: Cellulose acetate is dissolved in a solvent to form a solution, the solvent made up of from 5% to 50% by weight of carbon dioxide and from 95% to 50% of a compatible solvent such as acetone. The solvent is above the supercritical conditions of $CO_2$. The solution is filtrated of insoluble matter and extended to form a fiber or similar article.

10 Claims, No Drawings

PROCESSING CELLULOSE ACETATE FORMED ARTICLES USING SUPERCRITICAL FLUID

FIELD OF INVENTION

This invention is directed to forming cellulose acetate articles, particularly cellulose acetate yarns produced by extrusion of filament-forming material.

BACKGROUND OF THE INVENTION

Synthetic articles of cellulose acetate such as yarn filaments are traditionally produced by melt, wet, or dry spinning techniques, each being very well known in the art. For production of cellulose acetate filaments, the dry spinning technique has been utilized quite successfully in the past. That is, a solution (usually called a "dope" in art parlance) comprising cellulose acetate and a volatile solvent therefore is typically extruded through orifices into a gaseous medium which serves to volatilize and evaporate the solvent, thereby forming filaments of cellulose acetate. Usually multiple filaments are extruded, gathered into a yarn and the yarn is then wound upon a bobbin. Such yarns are then woven into fabrics, for a variety of textile end uses including garments, draperies and the like. Also, the cellulose acetate may be extruded into tow for use in making cigarette filters.

Solvents normally used in the dope are acetone and methylene chloride. Such solvents can easily escape into the environment, necessitating costly preventive measures. Reductions of such solvents is desirous.

Supercritical and near supercritical fluids have previously been described for: recycling cellulose esters from the waste from cigarette manufacture (See U.S. Pat. No. 5,328,934); removal of adhesives from cellulose (See U.S. Pat. No. 5,009,746); terpenes and oils from wood (See U.S. Pat. No. 4,308,200); lignin from Kraft streams (See U.S. Pat. No. 4,493,797); and removal of the natural oils from plant matter (See U.S. Pat. No. 4,675,198). Commercial applications of this technique include: the decaffeination of coffee and tea; extraction of hops flavors for beer manufacture; and denicotination of tobacco. Such commercial processes are well known to those skilled in the art and are described in reviews such as: McHugh and Krukonis, *Supercritical Fluid Extraction: Principles and Practice*, Butterworths; (1986); Eckert et al., Environmental Science and Technology, Vol. 20, pp. 319–325, (1986); "Supercritical Fluids", *Kirk-Othmer Encyclopedia of Chemical Technology* 3rd, John Wiley & Son, New York, each of the foregoing are incorporated herein by reference.

SUMMARY OF THE INVENTION

A process for preparing cellulose acetate articles, such as fibers, is disclosed herein. The process comprises the following steps: cellulose acetate is dissolved in a solvent to form a solution, the solvent made up of 5% to 50% by weight of carbon dioxide ($CO_2$) and from 50 to 95% by weight of a compatible chemical such as acetone, triacetin, ethanol and methanol. The solvent is under temperature and pressure conditions such that the solvent is above either the supercritical temperature or pressure, or both, conditions of $CO_2$. The solution is then filtered of insoluble matter and extruded to form a fiber, tow, etc.

DETAILED DESCRIPTION OF THE INVENTION

The present invention, which is directed to a process for preparing cellulose acetate articles, and using a solvent above the supercritical conditions of $CO_2$, is set forth in greater detail below.

In accordance with our invention, different articles can be formed from cellulose acetate such as filaments by extrusion of solutions of cellulose acetate material in a solvent of 5% to 50% by weight $CO_2$ and from 95% to 50% by weight of a compatible chemical wherein the solvent is above the supercritical conditions of $CO_2$. The solution is extruded through orifices of a spinneret forming filaments.

Cellulose acetate is the reaction product of cellulose and acetic anhydride. Secondary cellulose acetate is obtained by acid catalyzed hydrolysis of the triacetate to an average degree of substitution of 2.4 to 2.5 acetyl groups per glucose unit. The primary acetyl groups hydrolyze more readily than the secondary but the distribution is not uniform.

The cellulose acetate is dissolved in a solvent made up of $CO_2$ and a compatible chemical such as acetone, triacetin, ethanol, methanol or other compatible chemical such that the resulting solvent has conditions above the supercritical conditions of $CO_2$.

A supercritical fluid exists at or above its "critical point". The critical point of a pure material is the point of highest temperature and pressure at which the liquid and vapor (gas) phases can exist in equilibrium with one another. For a mixture, it represents the condition at which specific properties of the gas and liquid phases in equilibrium become identical.

A supercritical fluid possesses approximately the penetration properties of a gas simultaneously with the solvent properties of a liquid. Accordingly, supercritical fluid extraction has the benefit of high penetrability and good solvation. Exemplary fluids include, but are not limited to, carbon dioxide and propane. Other fluids are listed in the "Supercritical Fluids" section of Kirk-Othmer, Ibid., at Table 2, which is incorporated herein by reference. Carbon dioxide has a critical point of 31° C. and 72.9 atmospheres (about 1072 psig).

In the preferred embodiment, cellulose ester polymer is contacted with carbon dioxide within the pressure ranges of about 1400 psia to about 10,000 psia and within the temperature range of about 20° C. to about 80° C.

As set forth, it has been found that from 5% to 25% of $CO_2$ may be mixed with a compatible chemical such as acetone from 95% to 75%. In particular, it has found that with acetone, $CO_2$ may be mixed up 25%, with triacetin up to 30%, with ethanol up to 38%, and with methanol up to 50%. This forms the solvent into which the cellulose acetate is soluted.

To form a filament, the solution of the cellulosic material is extruded through a multihole spinneret into a precipitating bath or evaporative atmosphere; the fibers are formed by removal of this solvent.

Without limiting the foregoing invention, in any manner, it is further illustrated by way of the following examples.

EXAMPLE 1.

This example illustrates the procedure of mixing cellulose acetate into a solvent system above the supercritical conditions of $CO_2$. The system includes two Isco Electronics Syringe Pumps and a high pressure (5000 psig) view cell. The cellulose acetate is placed into the pressure view cell is purged with nitrogen at a pressure of about 50 psig. One syringe pump is used to deliver carbon dioxide and the other the co-solvent. Each is delivered to a mixing tee-block at a desired mixture composition. The resulting fluid mixture then passes through a mixing section, where further mixing takes place, before it flows into the view cell that has been charged with the cellulose acetate. The mixing cell and view cell are located inside an isothermal nitrogen bath. The system temperature and pressure are allowed to stabilize to allow the polymer to dissolve into the solvent. The solids concentration is in the 2–4% by weight of polymer to solvent.

If no dissolution occurs, the system is heated to a temperature as indicated in Table 1 for the different solvent mixtures. Table 1 describes each solvent mixture and its corresponding molar ratio, recorded pressure corresponding to the temperature at which the polymer begins to swell in the solvent and the temperature at which the polymer dissolves. No swelling or dissolution indicates the polymer is insoluble under the pertinent conditions. Reference is made to the Acetone/$CO_2$ mixtures that go from insolubility at a 50/50 mixture to partial solubility at a 60/40 mixture, to total solubility for a 70/30 mixture.

The rapid expansion of supercritical fluid polymer solution is initiated by opening a valve to permit the solution to expand through an orifice into the atmosphere. The solution is then collected for subsequent processing. Solubility results are shown in Table 1.

TABLE 1

Processing Cellulose Acetate Formed Articles Using Supercritical Fluids

| Solvent Mixture | Solvent Molar Ratio | Pressure Range-psig | Swelling Temp-°C. | Dissolution Temp-°C. |
|---|---|---|---|---|
| MeOH/$CO_2$ | 50/50 | 1045–4565 | 105 | 105 (Partial) |
| MeOH/$CO_2$ | 57/43 | 1165–3000 | 105 | 120 (Partial) |
| MeOH/$CO_2$ | 63/37 | 1050–3885 | 47 | 88 |
| MeOH/$CO_2$ | 100/0 | 1075–4500 | 45 | 100 |
| EtOH/$CO_2$ | 50/50 | 1170–4250 | 100 | 135 (Partial) |
| EtOH/$CO_2$ | 60/40 | 1250–2975 | 90 | 98 |
| EtOH/$CO_2$ | 100/0 | 130–225 | 48 | 112 |
| Acetone/$CO_2$ | 50/50 | 1150–3240 | None | None |
| Acetone/$CO_2$ | 60/40 | 1250–3365 | Ambient | 120 (Partial) |
| Acetone/$CO_2$ | 70/30 | 1125 | Ambient | 25 |
| Triacetin/$CO_2$ | 10/90 | 1150–3925 | None | None |
| Triacetin/$CO_2$ | 20/80 | 1135–2400 | Ambient | 130 (2-Phases) |
| Triacetin/$CO_2$ | 30/70 | 1200–5000 | Ambient | 98 |

MeOH = Methanol; EtOH = Ethanol

As is well known, the polymer solution may be used to form fibers or other articles of cellulose acetate.

We claim:

1. A process for producing articles of cellulose acetate, said process comprising the steps of:

a) dissolution of the cellulose acetate in a solvent to form a solution, said solvent comprising from 5% to 50% by weight of carbon dioxide and from 95% to 50% of a compatible chemical selected from the group consisting of acetone, triacetin, ethanol and methanol, the solvent being under pressure and temperature conditions such that the solvent is above either the supercritical temperature or pressure, or both, of the supercritical conditions of $CO_2$;

b. filtration of the solution to remove insoluble matter; and c. extrusion of the solution to form articles.

2. A process of claim 1 containing about 75% to 95% by weight acetone and 5% to 25% by weight $CO_2$.

3. A process of claim 1 containing about 70% to 95% by weight triacetin and 5% to 30% by weight $CO_2$.

4. A process of claim 1 containing about 62% to 95% by weight ethanol and 5% to 38% by weight $CO_2$.

5. A process of claim 1 containing about 95% to 50% by weight methanol and from 5% to about 50% by weight $CO_2$.

6. A process for producing articles of cellulose acetate, said process comprising the steps of:

(a) dissolution of the cellulose acetate in a solvent to form a solution, said solvent comprising from 5% to 50% by weight of carbon dioxide and from 95% to 50% of a compatible chemical selected from the group consisting of acetone, triacetin, ethanol and methanol, the solvent is above either the temperature of 31° C. or pressure of 72.9 atmospheres, or both;

(b) filtration of the solution to remove insoluble matter; and (c) extrusion of the solution to form articles.

7. A process of claim 6 containing about 75% to 95% by weight acetone and 5% to 25% by weight $CO_2$.

8. A process of claim 6 containing about 70% to 95% by weight triacetin and 5% to 30% by weight $CO_2$.

9. A process of claim 6 containing about 62% to 95% by weight ethanol and 5% to 38% by weight $CO_2$.

10. A process of claim 6 containing from about 95% to 50% by weight methanol and from 5% to about 50% by weight $CO_2$.

* * * * *